(12) United States Patent
Tsuchida

(10) Patent No.: US 12,204,640 B2
(45) Date of Patent: Jan. 21, 2025

(54) ASSESSMENT APPARATUS, SURROGATE MODEL GENERATION APPARATUS, ASSESSMENT METHOD, AND PROGRAM

(71) Applicant: NEC Corporation, Tokyo (JP)

(72) Inventor: Hikaru Tsuchida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 224 days.

(21) Appl. No.: 18/010,323

(22) PCT Filed: Jun. 18, 2020

(86) PCT No.: PCT/JP2020/023930
§ 371 (c)(1),
(2) Date: Dec. 14, 2022

(87) PCT Pub. No.: WO2021/255888
PCT Pub. Date: Dec. 23, 2021

(65) Prior Publication Data
US 2023/0315839 A1    Oct. 5, 2023

(51) Int. Cl.
*G06F 21/00* (2013.01)
*G06F 21/55* (2013.01)

(52) U.S. Cl.
CPC .................................. *G06F 21/55* (2013.01)

(58) Field of Classification Search
CPC ................................ G06F 21/55; G06N 20/00
See application file for complete search history.

(56) References Cited

U.S. PATENT DOCUMENTS

| 11,544,352 B2 | 1/2023 | Hasegawa |
| 2019/0287016 A1 | 9/2019 | Kato et al. |
| 2020/0082056 A1 | 3/2020 | Hasegawa |

(Continued)

FOREIGN PATENT DOCUMENTS

| JP | 2019-049975 A | 3/2019 |
| JP | 2019-057016 A | 4/2019 |

(Continued)

OTHER PUBLICATIONS

International Search Report for PCT Application No. PCT/JP2020/023930, mailed on Sep. 24, 2020.

(Continued)

*Primary Examiner* — William A Corum, Jr.
(74) *Attorney, Agent, or Firm* — Sughrue Mion, PLLC

(57) ABSTRACT

An assessment apparatus is able to access a surrogate model generation apparatus that comprises a query generation part that generates a first query causing an assessment target model to make an inference to obtain an inference result; an MIA execution part that executes a membership inference attack using as an input the inference result obtained by sending the first query to the assessment target model and infers virtual training data used to train the assessment target model; and a surrogate model generation part that uses the virtual training data to generate a surrogate model that emulates the behavior of the assessment target model, and the assessment apparatus comprises a security assessment part that transmits a second query to both the surrogate model and the assessment target model to assess the security of the assessment target model using the results therefrom.

15 Claims, 13 Drawing Sheets

(56) References Cited

U.S. PATENT DOCUMENTS

| | | | |
|---|---|---|---|
| 2020/0090036 A1 | 3/2020 | Nakata | |
| 2020/0312457 A1* | 10/2020 | Kasthurirathne | G16H 10/60 |
| 2021/0064760 A1* | 3/2021 | Sharma | G06F 21/577 |
| 2021/0334403 A1* | 10/2021 | Luus | G06N 3/088 |
| 2023/0274003 A1* | 8/2023 | Liu | G06N 3/094 |
| | | | 726/26 |

FOREIGN PATENT DOCUMENTS

| | | |
|---|---|---|
| JP | 2019-159835 A | 9/2019 |
| JP | 2020-021301 A | 2/2020 |
| JP | 2020-046883 A | 3/2020 |
| WO | 2018/216379 A1 | 11/2018 |

OTHER PUBLICATIONS

Grosse, Kathrin, et al., "Adversarial Examples for Malware Detection," European Symposium on Research in Computer Security, Springer, Cham, 2017, [online], [retrieved on May 21, 2020], the Internet <URL: https://link.springer.com/chapter/10.1007/978-3-319-66399-9_4>.

Weiwei Hu, Ying Tan, "Generating Adversarial Malware Examples for Black-Box Attacks Based on GAN," [online], [retrieved on May 21, 2020], the Internet <URL: https://arxiv.org/abs/1702.05983>.

Liwei Song, Reza Shokri, Prateek Mittal, "Privacy Risks of Securing Machine Learning Models against Adversarial Examples," CCS '19: Proceedings of the 2019 ACM SIGSAC Conference on Computer and Communications Security, Nov. 2019, pp. 241-257, [online], [retrieved on May 21, 2020], the Internet <URL: https://dl.acm.org/doi/10.1145/3319535.3354211>.

Park, Yeachan et al., "Membership Inference Attacks Against Object Detection Models", arXiv[online], Jan. 28, 2020 [retrieved on Sep. 9, 2020]. Retrieved from the Internet: <URL: https://arxiv.org/pdf/2001.04011 v2. pdf>.

Nasr, Milad et al, "Machine Learning with Membership Privacy using Adversarial Regularization", arXiv[online], Jul. 16, 2018 [retrieved on Sep. 9, 2020], Retrieved from the Internet: <URL: https://arxiv.org/pdf/1807.05852vl.pdf>, pp. 1-14.

JP Office Action for JP Application No. 2022-531194, mailed on Mar. 5, 2024 with English Translation.

Reza Shokri et al., "Membership Inference Attacks against Machine Learning Models", arXiv:1610.05820v2 <URL:https://arxiv.org/pdf/1610.05820v2.pdf>, Mar. 31, 2017, pp. 1-pp. 16.

* cited by examiner

ASSESSMENT APPARATUS, SURROGATE MODEL GENERATION APPARATUS, ASSESSMENT METHOD, AND PROGRAM

FIELD

This application is a National Stage Entry of PCT/JP2020/023930 filed on Jun. 18, 2020, the contents of all of which are incorporated herein by reference, in their entirety.

The present invention relates to an assessment apparatus, surrogate model generation apparatus, assessment method, and program.

BACKGROUND

Patent Literature 1 discloses a classification apparatus that detects unknown malware using AI (Artificial Intelligence). Specifically, the literature states that a classifier is trained and generated by using a benign communication log representing one from a terminal performing normal communication and a communication log from a terminal infected with malware to inspect an unknown communication log using the classifier.

Patent Literature 2 discloses a training data evaluation apparatus capable of evaluating the contribution of training data to requirements for identifying an inference target. Specifically, the literature states that training data is divided into a plurality of batch datasets and a model is trained using the plurality of batch datasets sequentially. Then, the training data evaluation apparatus stores in a training process storage part a model in the process of changing through training in which the batch datasets are sequentially applied and information of the batch datasets that generated each model. Finally, the training data evaluation apparatus evaluates each model by applying test data to a plurality of models stored in the training process storage part and selects a batch dataset on the basis of the result of evaluating each model.

Adversarial Examples (AEs) are known as a method for attacking the classification apparatus using AI described in Patent Literature 1 (refer to Non-Patent Literature 1). AEs are input data to an attack target model that cause the model to output unexpected results and perform misclassification. In particular, if one can cause misclassification by adding some kind of noise in the detection of malware discussed in Patent Literature 1, this will become a serious security issue, and effective countermeasures are called for.

Further, Non-Patent Literature 2 proposes a method for generating AEs described above using a test data generation technology called GAN (Generative Adversarial Network).

Algorithms that generate models robust against AEs have also been developed. Meanwhile, Non-Patent Literature 3 reports that a model robust against AEs is more susceptible to membership inference attacks (MI attacks; also known as MIA) that determine if data has been used for training.

[Patent Literature 1]
 Japanese Patent Kokai Publication No. JP2019-57016A
[Patent Literature 2]
 Japanese Patent Kokai Publication No. JP2020-21301A

Non Patent Literature

[Non-Patent Literature 1]
Grosse, Kathrin, et al., "Adversarial Examples for Malware Detection," European Symposium on Research in Computer Security, Springer, Cham, 2017, [online], [retrieved on May 21, 2020], the Internet <URL: https://link.springer.com/chapter/10.1007/978-3-319-66399-9_4>

[Non-Patent Literature 2]
Weiwei Hu, Ying Tan, "Generating Adversarial Malware Examples for Black-Box Attacks Based on GAN," [online], [retrieved on May 21, 2020], the Internet <URL: https://arxiv.org/abs/1702.05983>

[Non-Patent Literature 3]
Liwei Song, Reza Shokri, Prateek Mittal, "Privacy Risks of Securing Machine Learning Models against Adversarial Examples," CCS '19: Proceedings of the 2019 ACM SIGSAC Conference on Computer and Communications Security, November 2019, Pages 241-257, [online], [retrieved on May 21, 2020], the Internet <URL: https://dl.acm.org/doi/10.1145/3319535.3354211>

SUMMARY

The following analysis is given by the present inventor. As discussed in Background, there is a need to assess the security of a learning model (simply referred to as "model" hereinafter), which is the core of a system using AI. One of the assessment items can be resistance to AEs, and if what is pointed out in Non-Patent Literature 3 is true, it is also necessary to assess the resistance to MI attacks.

It is an object of the present invention to provide an assessment apparatus, surrogate model generation apparatus, assessment method, and program capable of assessing the security of an assessment target model in terms of resistance to both AEs and MI attacks described above.

Solution to Problem

According to a first aspect, there is provided an assessment apparatus capable of accessing a surrogate model generation apparatus that comprises a query generation part that generates a first query causing an assessment target model to make an inference to obtain an inference result; an MIA execution part that executes a membership inference attack using as an input the inference result obtained by sending the first query to the assessment target model and infers virtual training data used to train the assessment target model; and a surrogate model generation part that uses the virtual training data to generate a surrogate model that emulates the behavior of the assessment target model, and the assessment apparatus comprises a security assessment part that transmits a second query to both the surrogate model and the assessment target model to assess the security of the assessment target model using the results therefrom.

According to a second aspect, there is provided a surrogate model generation apparatus comprising a query generation part that generates a first query causing an assessment target model to make an inference to obtain an inference result; an MIA execution part that executes a membership inference attack using as an input the inference result obtained by sending the first query to the assessment target model and generates virtual training data used to train the assessment target model; and a surrogate model generation part that uses the virtual training data to generate a surrogate model that emulates the behavior of the assessment target model.

According to a third aspect, there is provided a security assessment method of a computer for an assessment target model, the computer is capable of accessing a surrogate model generation apparatus that comprises a query generation part that generates a first query causing an assessment target model to make an inference to obtain an inference result; an MIA execution part that executes a membership inference attack using as an input the inference result obtained by sending the first query to the assessment target model and infers virtual training data used to train the assessment target model; and a surrogate model generation part that uses the virtual training data to generate a surrogate model that emulates the behavior of the assessment target model, and the security assessment method causes the computer to transmit a second query to both the surrogate model and the assessment target model and assess the security of the assessment target model using each inference result from the surrogate model and the assessment target model in response to the second query. The method described above is tied to a particular machine, namely a computer capable of transmitting the second query to both the surrogate model and the assessment target model and receiving the inference results therefrom.

According to a fourth aspect, there is provided a computer program for realizing the functions of the computer described above. The program is supplied to a computer apparatus using an input device or from the outside via a communication interface, is stored in a storage device, operates a processor according to predetermined steps or processes, is capable of displaying the processing results thereof including an intermediate state as necessary via a display device step by step, or is able to communicate with the outside via the communication interface. For instance, the computer apparatus for this purpose comprises a processor, a storage device, an input device, a communication interface and a display device, if necessary, that can typically access each other by a bus. Further, this program can be stored in a computer-readable (non-transitory) storage medium.

According to the present invention, it becomes possible to assess the security of an assessment target model in terms of resistance to both AEs and MI attacks described above.

EXAMPLE EMBODIMENTS

Figure 1:
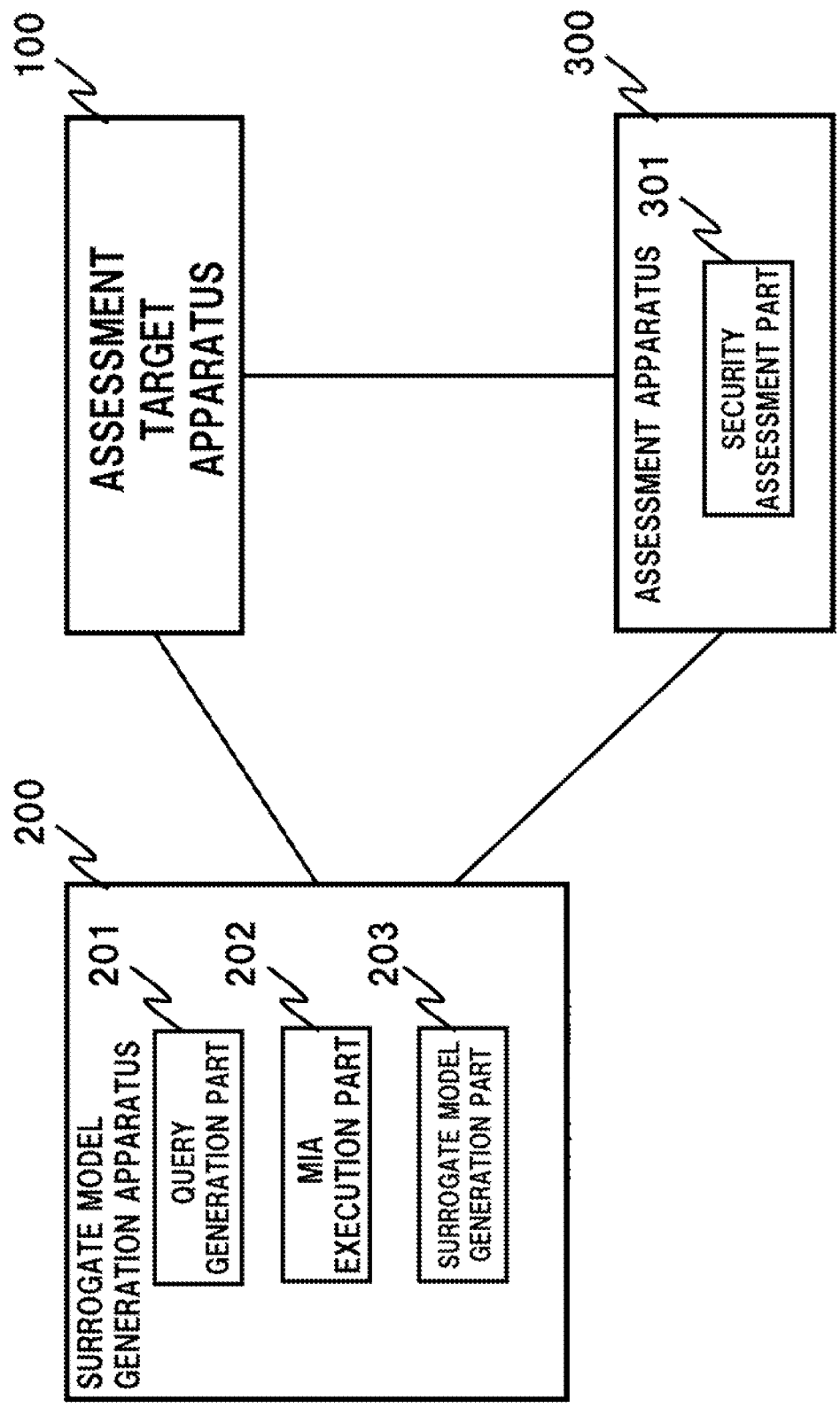
FIG. 1 is a block diagram showing the configuration of an example embodiment of the present invention.

First, an outline of an example embodiment of the present invention will be given with reference to the drawings. It should be noted that the drawing reference signs in the outline are given to each element for convenience as an example to facilitate understanding and are not intended to limit the present invention to the illustrated aspects. Further, connection lines between blocks in the drawings referred to in the following description can be both bidirectional and unidirectional. A unidirectional arrow schematically shows the main flow of a signal (data) and does not exclude bidirectionality. A program is executed by a computer apparatus and the computer apparatus comprises, for instance, a processor, a storage device, an input device, a communication interface, and a display device as necessary. Further, the computer apparatus is configured to be able to perform wired or wireless communication with an internal device therein or external device (including a computer) via the communication interface. Although the input/output connection points of each block in the drawings have ports or interfaces, these are not illustrated. Further, in the following description, "A and/or B" means at least one of A and B.

As shown in FIG. 1, an example embodiment of the present invention can be realized by a configuration that includes a surrogate model generation apparatus 200 and an assessment apparatus 300, both of which are able to access an assessment target apparatus 100 that holds an assessment target model.

The surrogate model generation apparatus 200 comprises a query generation part 201, an MIA execution part 202, and a surrogate model generation part 203. The query generation part 201 generates a first query that causes an assessment target model to make an inference to obtain an inference result. The MIA execution part 202 executes a membership inference attack using as an input the inference result obtained by sending the first query to the assessment target model and infers virtual training data used to train the assessment target model. The surrogate model generation part 203 uses the virtual training data to generate a surrogate model that emulates the behavior of the assessment target model.

The assessment apparatus 300 is able to access both the surrogate model generation apparatus 200 and the assessment target apparatus 100 that holds an assessment target model. Further, the assessment apparatus 300 comprises a security assessment part 301 that transmits a second query to both the surrogate model and the assessment target model and assesses the security of the assessment target model using the results therefrom.

Figure 2:
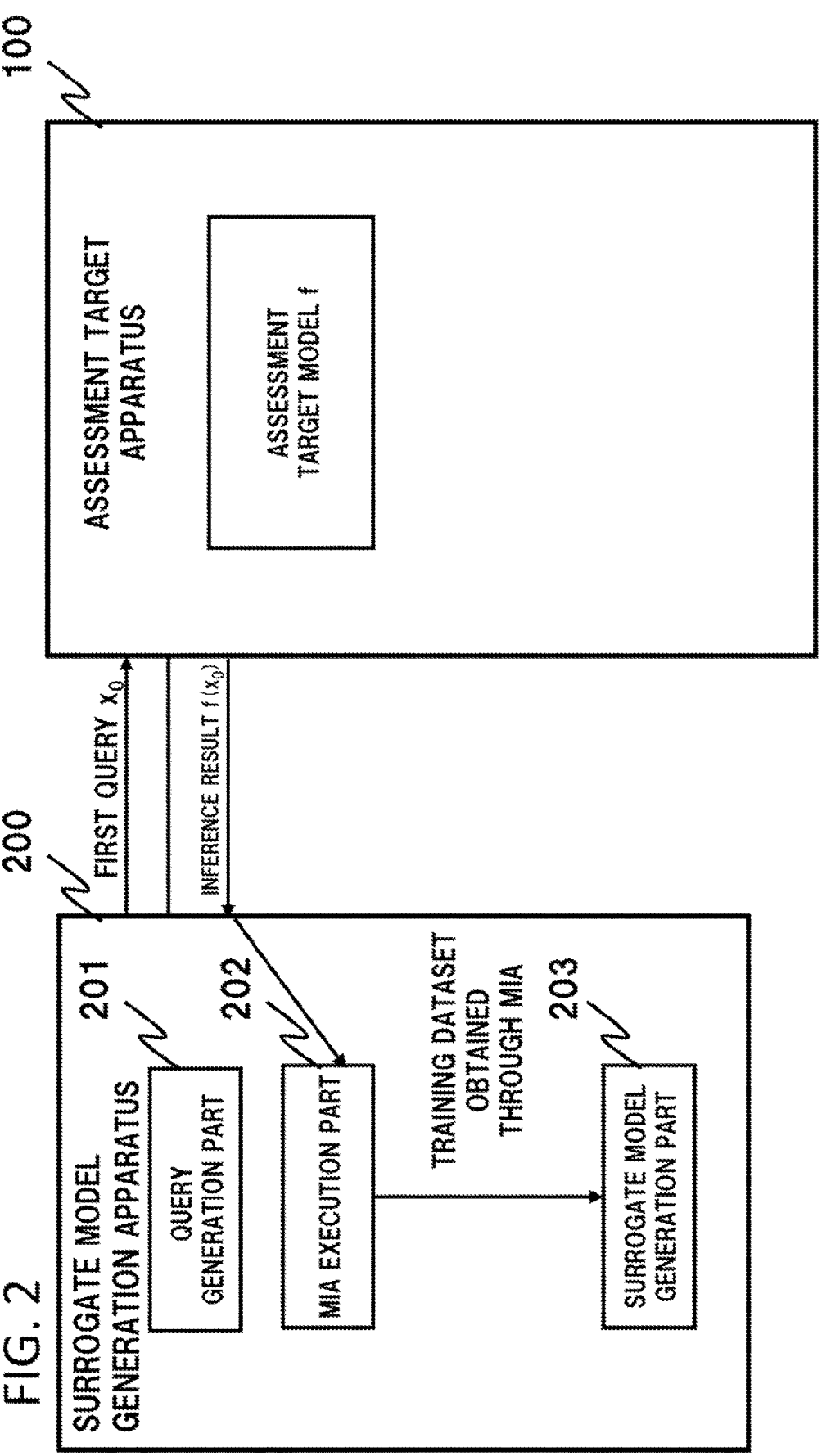
FIG. 2 is a drawing for explaining the operation of an example embodiment of the present invention.

The surrogate model generation apparatus 200 and the assessment apparatus 300 operate as follows. First, the process of generating a surrogate model performed by the surrogate model generation apparatus 200 will be described using FIG. 2. In the following description, f denotes an assessment target model and f(x) denotes an inference result obtained by supplying a query x as an input.

First, the surrogate model generation apparatus 200 generate a first query $x_0$ for causing the assessment target model to make an inference to obtain an inference result.

The surrogate model generation apparatus 200 transmits the first query $x_0$ to the assessment target apparatus 100 and obtains an inference result $f(x_0)$ from the assessment target apparatus 100. Next, the surrogate model generation apparatus 200 executes a membership inference attack using the inference result $f(x_0)$ as an input and infers virtual training data used to train the assessment target model f. For instance, the surrogate model generation apparatus 200 determines whether or not the first query $x_0$ is data used to train the assessment target model f. The surrogate model generation apparatus 200 is able to obtain a set of virtual training data by repeating the generation of the first queries and the execution of membership inference attacks on the inference results.

Using the virtual training data obtained as described above, the surrogate model generation apparatus 200 generates a surrogate model that emulates the behavior of the assessment target model. In the following description, a model g denotes the surrogate model that emulates the behavior of the assessment target model f, and g(x) denotes an inference result obtained by supplying a query x as an input.

Figure 3:
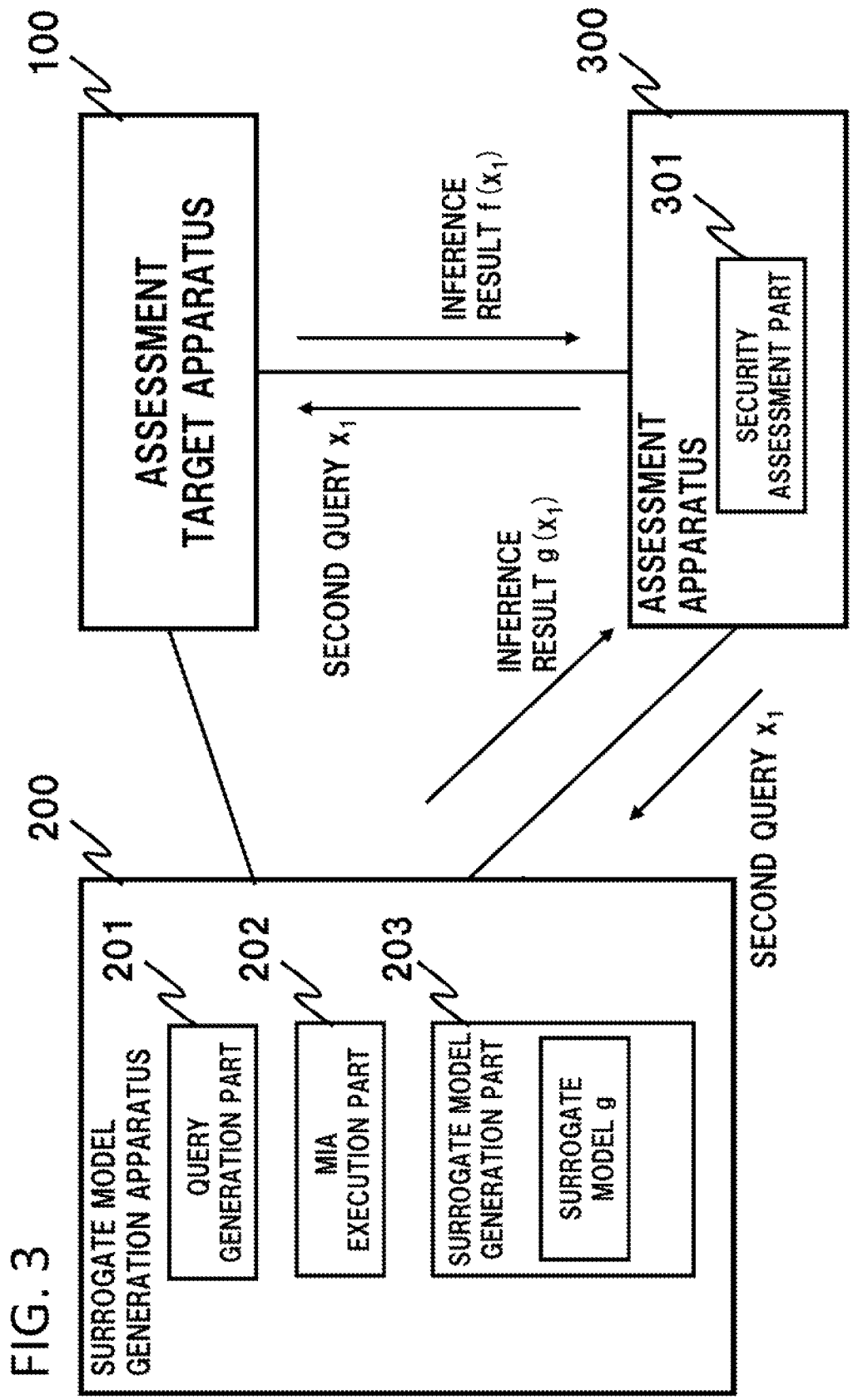
FIG. 3 is a drawing for explaining the operation of an example embodiment of the present invention.

Using FIG. 3, the following describes how the assessment target model f is assessed by the assessment apparatus 300. The assessment apparatus 300 transmits a second query $x_1$ to both the surrogate model g and the assessment target model f and assesses the security of the assessment target model using the results therefrom. Various methods may be used to assess the security of the assessment target model. For instance, the degree of matching between the inference result g(x) and the inference result f(x) may be used as an assessment value for the security of the assessment target model f. If this degree is high, the assessment target model f is at least likely to have data used to train it identified by the MIA and may be vulnerable to model extraction attacks (surrogate model generation attacks).

Further, the number of first queries required until the degree of matching between the inference result g(x) and the inference result f(x) reaches a certain level or higher may be used as an assessment value for the security of the assessment target model f. If the number of required first queries is low, it means that a surrogate model with a certain level of accuracy can be generated at low cost, and the assessment target model f may be vulnerable to model extraction attacks (surrogate model generation attacks).

As described above, according to the present example embodiment, it becomes possible to assess the security of the assessment target model f by generating the surrogate model g that emulates the behavior of the assessment target model f and using the results obtained by sending the second query as an input to both models.

FIRST EXAMPLE EMBODIMENT

Figure 4:
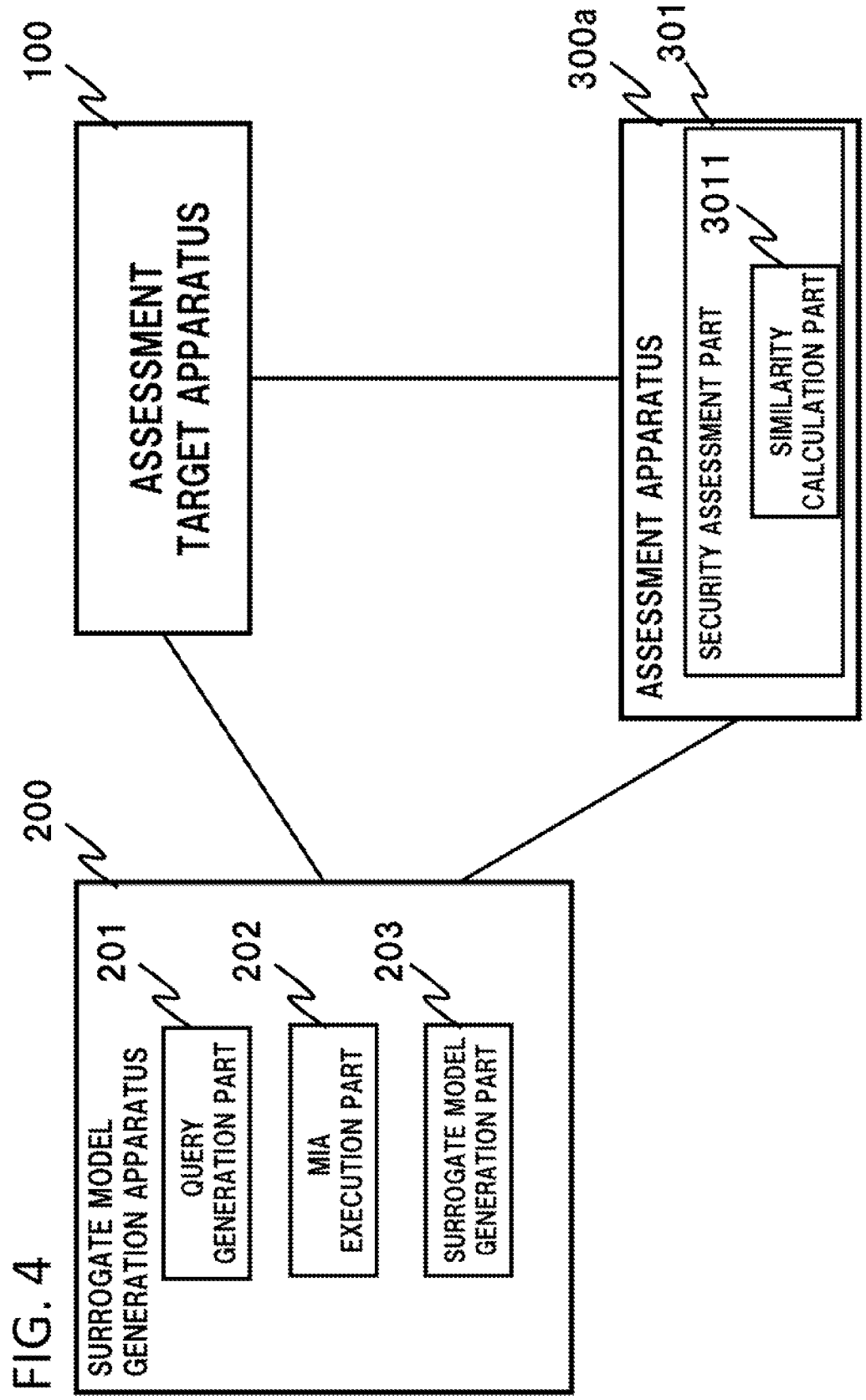
FIG. 4 is a block diagram showing the configuration of a first example embodiment of the present invention.

Next, a first example embodiment of the present invention will be described in detail with reference to the drawings. FIG. 4 is a block diagram illustrating the configuration of the first example embodiment of the present invention. FIG. 4 shows a configuration in which the assessment target apparatus 100, the surrogate model generation apparatus 200, and an assessment apparatus 300a are interconnected.

The assessment target apparatus 100 is an apparatus that holds the model f and provides services. In the present example embodiment, the security of the model f is assessed. When the assessment target apparatus 100 is installed in a corporation or store, the assessment target apparatus 100 may be connected to the surrogate model generation apparatus 200 and the assessment apparatus 300a via the Internet.

The surrogate model generation apparatus 200 comprises the query generation part 201, the MIA execution part 202, and the surrogate model generation part 203, and generates a surrogate model that emulates the behavior of an assessment target model.

The query generation part 201 generates the first query that causes an assessment target model to make an inference to obtain an inference result. The first query may be generated using GAN, which is used to generate AEs in Non-Patent Literature 2. Further, the query generation part 201 preferably generates N queries that are more than M pieces of virtual training data required for the surrogate model generation part 203 to generate the surrogate model.

The MIA execution part 202 executes an MIA using as an input the inference result f(x) obtained by inputting the first query to the assessment target model f. Specifically, the MIA execution part 202 holds a classifier that determines, using the inference result f(x), whether or not x is data used to train the model f and computes a score indicating whether or not x is data used to train the model f from the output thereof. By aggregating data x with a score not less than a predetermined value and its label y and data x with a score of or above a predetermined ranking and its label y, a dataset assumed to be used to train the assessment target model f can be obtained. This dataset is referred to as the virtual training data hereinafter. As stated above, when the query generation part 201 generates N queries, the MIA execution part 202 selects M pieces of the virtual training data having top M scores using N inference results as inputs.

Using the virtual training data obtained as described above, the surrogate model generation part 203 generates the surrogate model g that emulates the behavior of the assessment target model f. The surrogate model g may be generated by using various machine learning algorithms that generate models from training data. It goes without saying that, if the machine learning algorithm used to generate the model f can be inferred, it is preferable to use the same machine learning algorithm.

The assessment apparatus 300a comprises the security assessment part 301 comprising a similarity calculation part 3011. The similarity calculation part 3011 sends the second query to both the surrogate model g and the assessment target model f and calculates the similarity between the respective inference results g(x) and f(x). The similarity calculation part 3011 generates a predetermined number of the second queries and calculates the ratio of matching inference results to all the results obtained from the second queries as the similarity. This similarity can be used as an assessment value indicating the security of the assessment target model f. If the inference result from the assessment target model f is a score, the distance between g(x) and f(x) may be calculated as the similarity.

Figure 5:
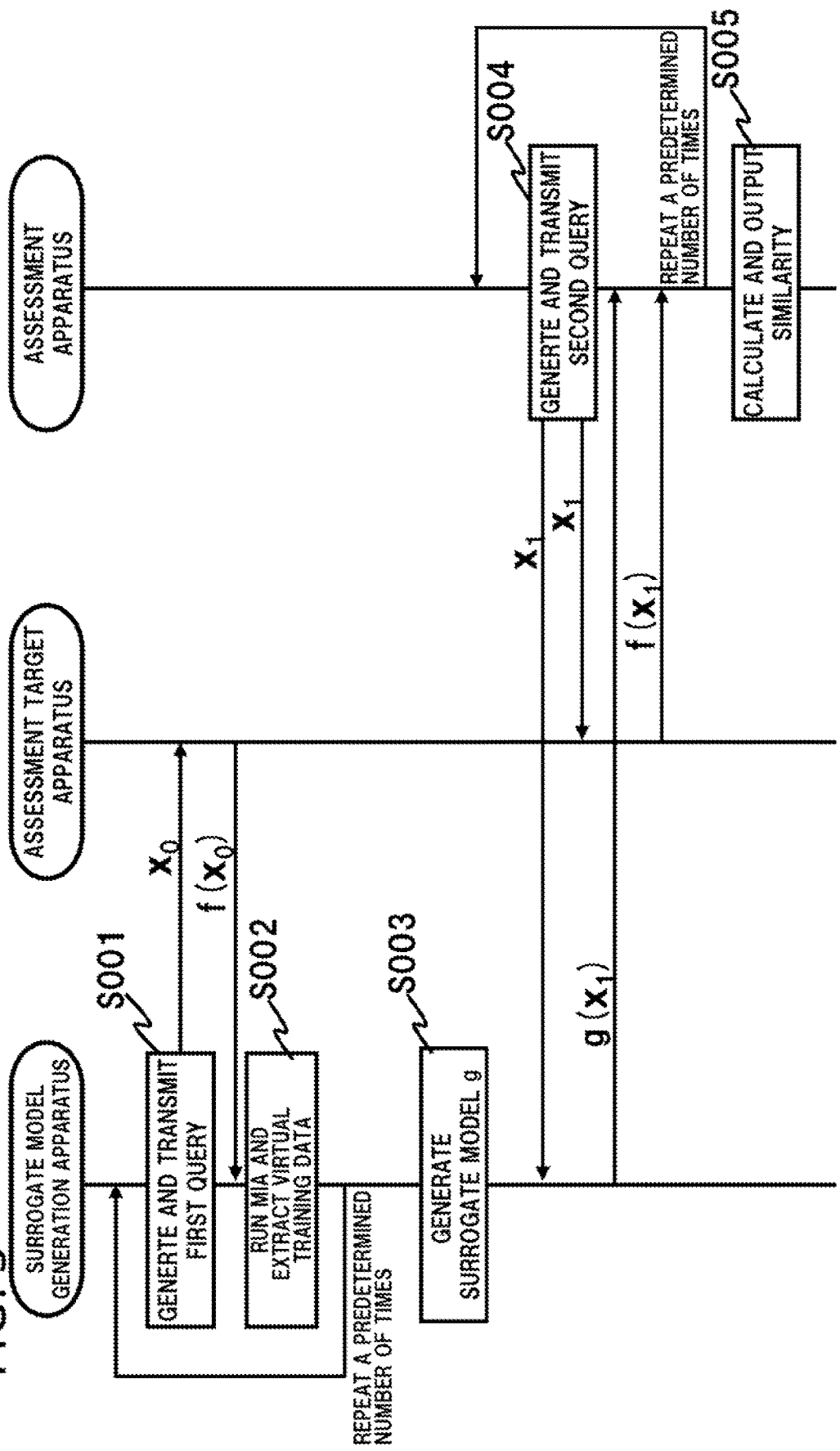
FIG. 5 is a sequence diagram for explaining the operation of the first example embodiment of the present invention.

Next, the operation of the present example embodiment will be described in detail with reference to a drawing. FIG. 5 is a sequence diagram for explaining the operation of the first example embodiment of the present invention. With reference to FIG. 5, the surrogate model generation apparatus 200 first generates the first query $x_0$ and transmits it to the assessment target apparatus 100 (step S001). The assessment target apparatus 100 returns to the surrogate model generation apparatus 200 the inference result $f(x_0)$ obtained by inputting the first query $x_0$ to the model f.

The surrogate model generation apparatus 200 executes an MIA using the inference result $f(x_0)$ and performs a process of extracting the virtual training data (step S002). The surrogate model generation apparatus 200 repeats the process until the number (a batch size of M) of the virtual training data required to train the surrogate model g is obtained. Specifically, the surrogate model generation apparatus 200 computes from the inference result $f(x_0)$ a score indicating how likely $x_0$ is training data for the model f and extracts M first queries having top M scores and the labels thereof as the virtual training data.

The surrogate model generation apparatus 200 generates the surrogate model g using the virtual training data having the batch size of M (step S003). Thus, the surrogate model generation apparatus 200 completes the generation of the surrogate model g.

Next, the assessment apparatus 300a starts the assessment of the assessment target model f. The assessment apparatus 300a first generates the second query $x_1$ and transmits it to the assessment target apparatus 100 and the surrogate model generation apparatus 200 (step S004).

The assessment target apparatus 100 returns to the assessment apparatus 300a an inference result $f(x_1)$ obtained by inputting the second query $x_1$ to the model f. Likewise, the surrogate model generation apparatus 200 returns to the assessment apparatus 300a an inference result $g(x_1)$ obtained by inputting the second query $x_1$ to the surrogate model g.

The assessment apparatus 300a repeats the step S004 the number of times required for the similarity calculation. Finally, the assessment apparatus 300a calculates the similarity p between the inference result $f(x_1)$ received from the assessment target apparatus 100 and the inference result $g(x_1)$ received from the surrogate model generation apparatus 200 (step S005).

The higher the value of the similarity p calculated as described above, the more elaborately the behavior of the target model f is emulated. Therefore, this can be used as an index of the security of the assessment target model f.

SECOND EXAMPLE EMBODIMENT

Figure 6:
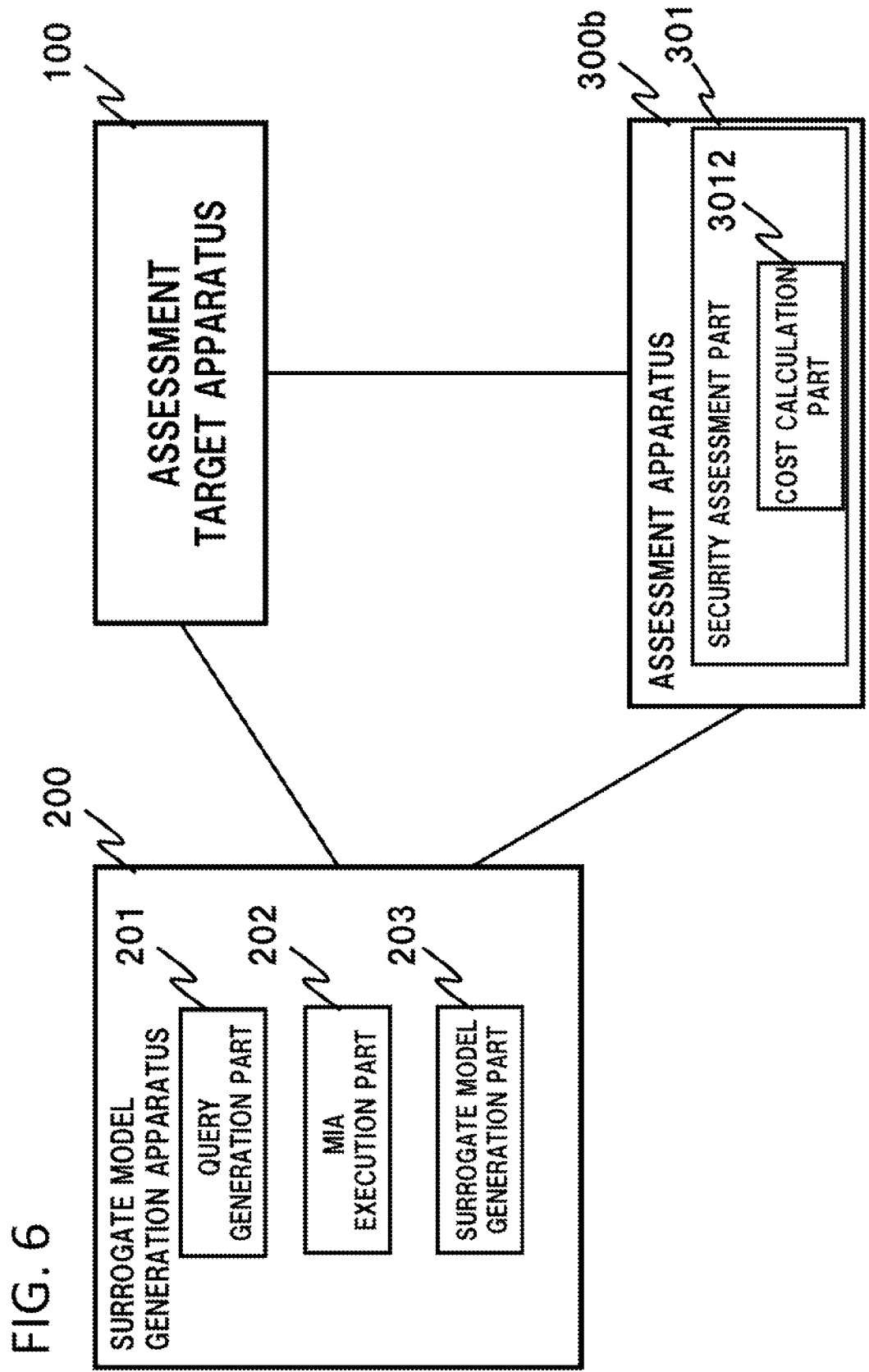
FIG. 6 is a block diagram showing the configuration of a second example embodiment of the present invention.

Next, with reference to the drawings, the following describes in detail a second example embodiment of the present invention in which the cost of generating the surrogate model g with a certain degree of accuracy is calculated as an index of the security of the assessment target model f. FIG. 6 is a block diagram illustrating the configuration of the second example embodiment of the present invention. The second example embodiment differs from the first example embodiment shown in FIG. 4 in that, instead of the similarity calculation part 3011, a cost calculation part 3012 is provided in the security assessment part 301 of an assessment apparatus 300b. Besides this, the second example embodiment is configured in the same manner as the first example embodiment, therefore the differences will be mainly described below.

The cost calculation part 3012 sends the second query to both the surrogate model g and the assessment target model f and calculates the similarity between the respective inference results g(x) and f(x). Further, when the similarity does not reach a predetermined value, the cost calculation part 3012 instructs the surrogate model generation apparatus 200 to update the surrogate model g. Then, as soon as a certain degree of similarity is achieved, the cost calculation part 3012 calculates the cost of generating the surrogate model g. The cost of generating the surrogate model g may be calculated by obtaining, for instance, the number of times the second queries are sent, the number of times the surrogate model generation apparatus 200 transmits the first queries, and the number of the virtual training data.

Figure 7:
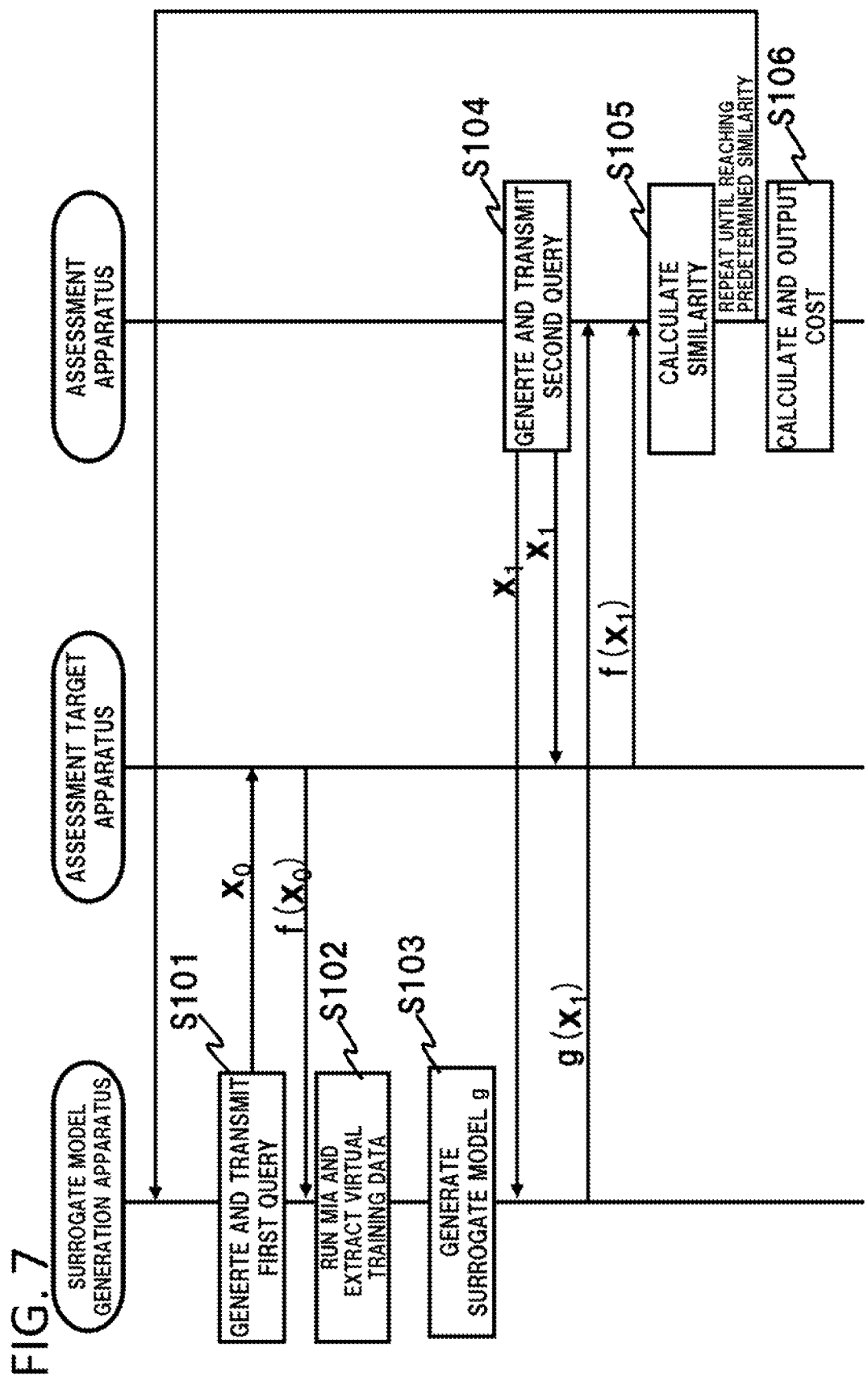
FIG. 7 is a sequence diagram for explaining the operation of the second example embodiment of the present invention.

Next, the operation of the present example embodiment will be described in detail with reference to a drawing. FIG. 7 is a sequence diagram for explaining the operation of the second example embodiment of the present invention. Since the processes of steps S101, S102, and S103 in FIG. 7 are the same as those of the steps S001, S002, and S003 of the first example embodiment, the description thereof will be omitted. Note that, instead of generating the surrogate model from scratch, for instance, it may be generated in advance using M pieces of the virtual training data, as in the first example embodiment.

Next, the assessment apparatus 300b starts the assessment of the assessment target model f. The assessment apparatus 300b first generates the second query $x_1$ and transmits it to the assessment target apparatus 100 and the surrogate model generation apparatus 200 (step S104).

The assessment target apparatus 100 returns to the assessment apparatus 300b the inference result $f(x_1)$ obtained by inputting the second query $x_1$ to the model f. Likewise, the surrogate model generation apparatus 200 returns to the assessment apparatus 300b the inference result $g(x_1)$ obtained by inputting the second query $x_1$ to the surrogate model g.

The assessment apparatus 300b calculates the similarity p between the inference result $f(x_1)$ received from the assessment target apparatus 100 and the inference result $g(x_1)$ received from the surrogate model generation apparatus 200 (step S105). When the similarity p is less than a predetermined threshold value, the assessment apparatus 300b requests the surrogate model generation apparatus 200 to execute the processes of the steps S101 to S103.

When the similarity p is equal to or greater than the predetermined threshold value, the assessment apparatus 300b calculates the cost of generating the surrogate model g having the predetermined similarity (step S106). The cost of generating the surrogate model g may be calculated by using, for instance, the number of times the first and the second queries are transmitted or the number of the virtual training data.

The lower the value of the cost of generating the surrogate model g calculated as described above, the easier it is to generate a surrogate model that emulates the behavior of the target model f. Therefore, this can be used as an index of the security of the assessment target model f.

THIRD EXAMPLE EMBODIMENT

Figure 8:
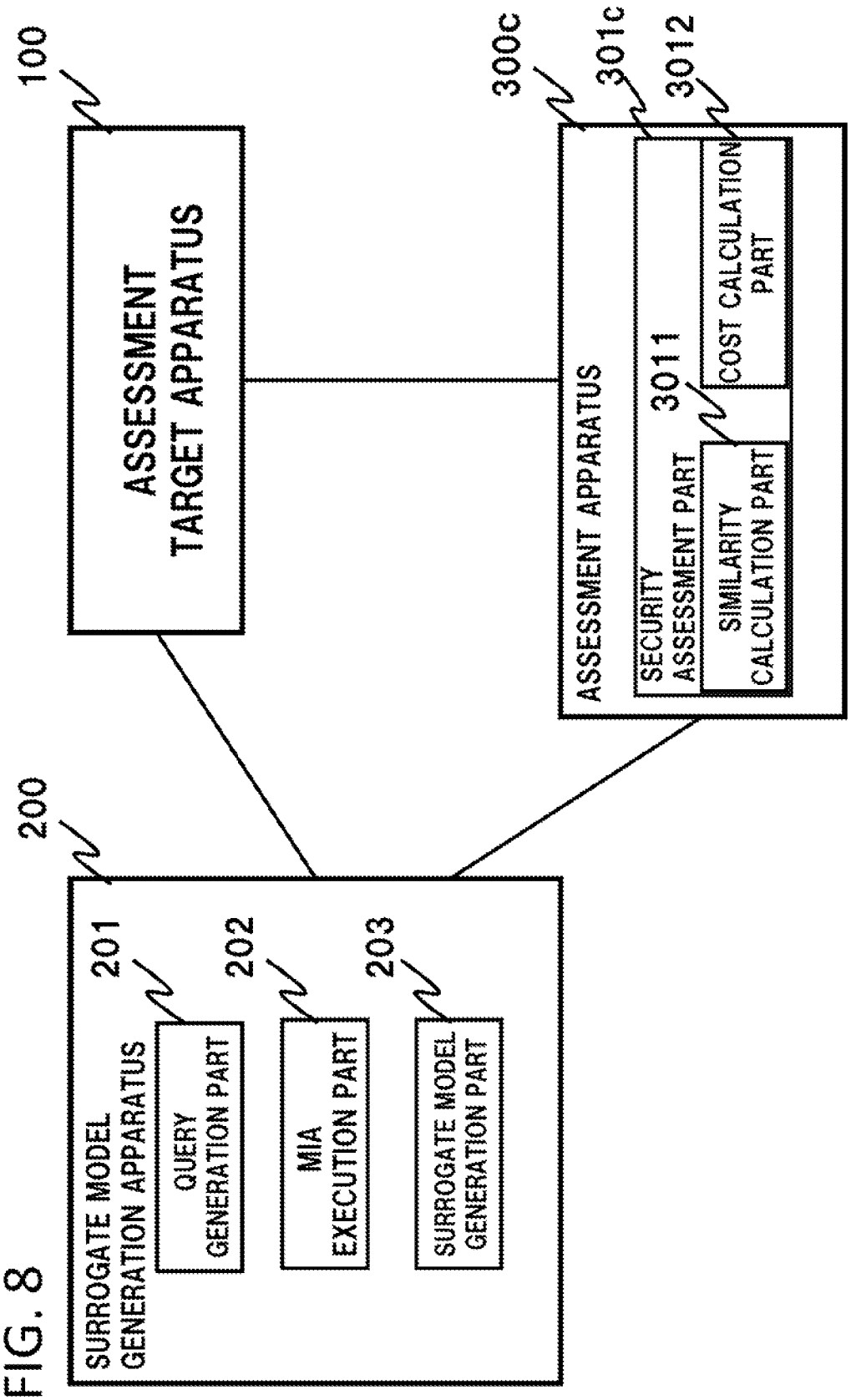
FIG. 8 is a block diagram showing the configuration of a third example embodiment of the present invention.

The assessment apparatuses 300a and 300b of the first and the second example embodiments described above may be implemented as the same apparatus. FIG. 8 is a block diagram illustrating the configuration of a third example embodiment of the present invention. The third example embodiment differs from the first and the second example embodiments shown in FIGS. 4 and 6 in that the similarity calculation part 3011 and the cost calculation part 3012 are provided in a security assessment part 301c of an assessment apparatus 300c. Since the basic configuration and operation are the same as those of the first and the second example embodiments, the description thereof will be omitted.

In the present example embodiment, for instance, an assessment value a indicating the security of the assessment target model f can be calculated by the following Math. 1.

$$a = w*p/(q+d) \qquad (1)$$

Here, d is the number of data used in an attack, q is the number of queries used in an attack, and w is a weight.

As is clear from Math. 1, a becomes smaller as q+d increases. What increases q+d is increasing numbers of data and queries required in an attack. Therefore, a in Math. 1 can be used as an index that gets smaller as it becomes more difficult to launch an attack.

Further, the lower the value of the similarity p, the smaller a in Math. 1 becomes. A low similarity indicates that the accuracy of the surrogate model g is low, and this also demonstrates that a in Math. 1 can be used as an index that gets smaller as it becomes more difficult to launch an attack.

As the value of the weight w increases, so does a in Math. 1. By adjusting the weight, it is possible to adjust whether a situation is advantageous for an attacker. For instance, there are several scenarios of attacks against the assessment target model f such as one in which an attack can be launched with only output labels or an attack is not possible without both labels and scores. By performing assessment using Math. 1 above with the weight representing the advantageousness of an attacker, it is possible to compare different models using the same assessment value a.

Further, the lower the value of a in Math. 1, the more difficult it is for an attacker to launch an attack. In other words, the cost of attacking a model having a high value of a is high. Instead of the assessment value a, 1/a may be used as an index of the cost of attacking the model f.

FOURTH EXAMPLE EMBODIMENT

Adversarial examples (AEs) may be generated by using the surrogate model g obtained by the surrogate model generation apparatus 200 of the first to the third example embodiments described above (refer to Non-Patent Literature 1). Next, the following describes a fourth example embodiment in which AEs are generated by using the surrogate model g to launch an attack on the assessment target model f and the result of the attack is outputted as an assessment value.

Figure 9:
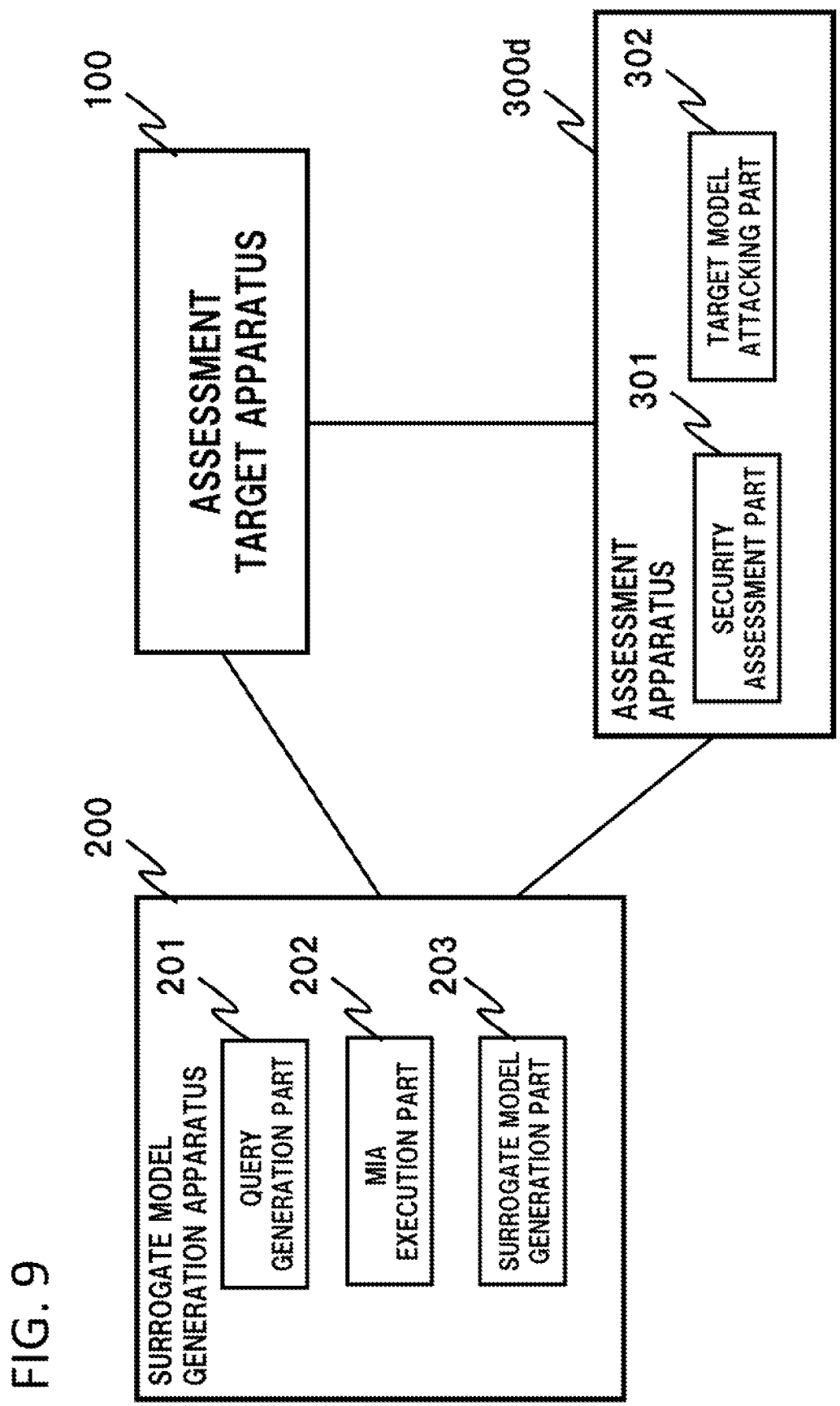
FIG. 9 is a block diagram showing the configuration of a fourth example embodiment of the present invention.

FIG. 9 is a block diagram illustrating the configuration of the fourth example embodiment of the present invention. The fourth example embodiment differs from the first to the third example embodiments shown in FIGS. 4, 6, and 8 in that a target model attacking part 302 is provided in an assessment apparatus 300d in addition to the security assessment part 301. Besides this, the basic configuration and operation are the same as those of the first to the third example embodiments, therefore the differences will be mainly described below.

The target model attacking part 302 generates adversarial examples (AEs) using the surrogate model g generated by the surrogate model generation apparatus 200. Then, the target model attacking part 302 transmits the AEs to the assessment target apparatus 100 and calculates a statistical value indicating whether or not the assessment target model f malfunctions. That the similarity between the assessment target model f and the surrogate model g is equal to or greater than a predetermined threshold value may be a prerequisite for the target model attacking part 302 to generate AEs.

Figure 10:
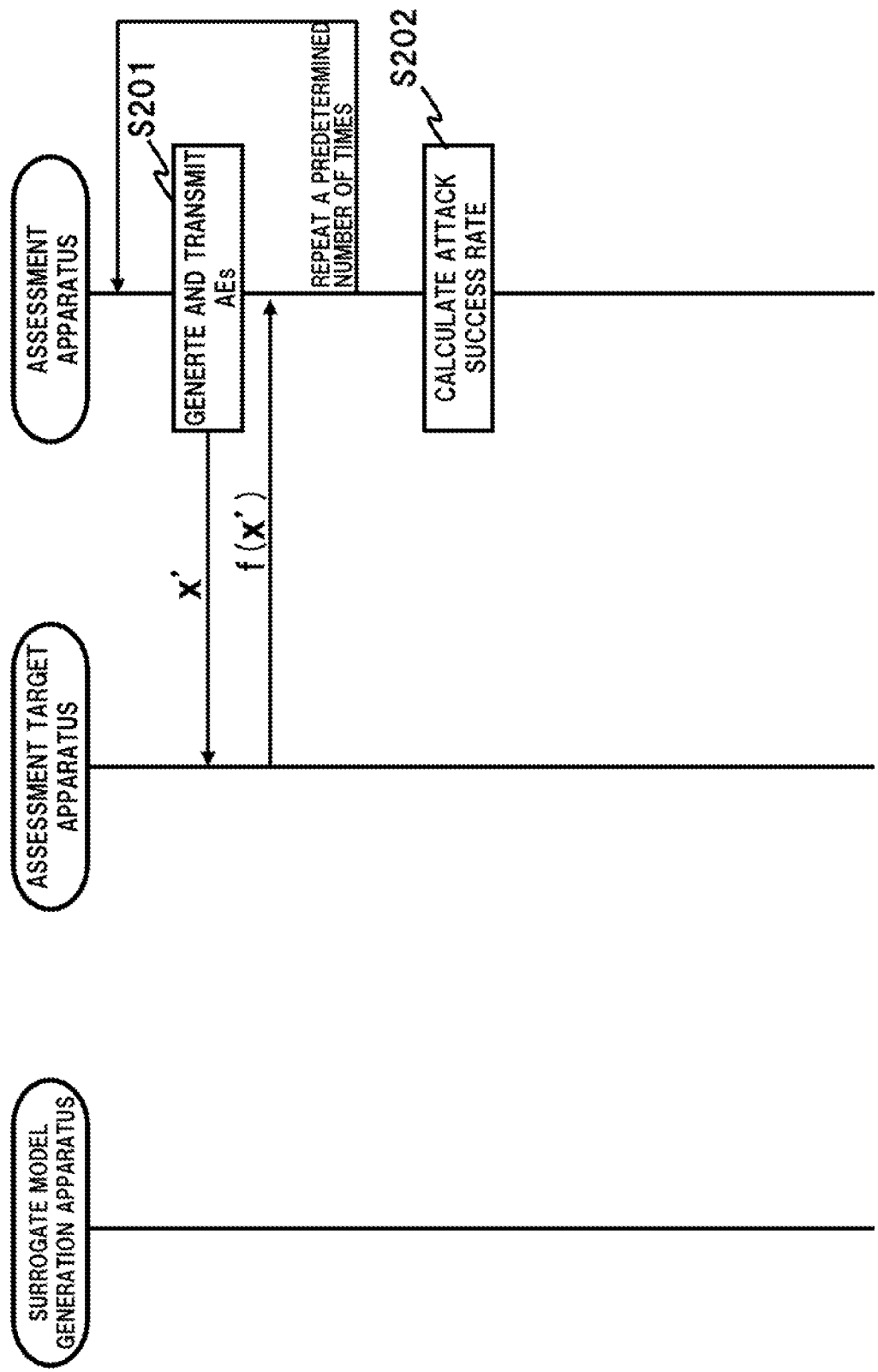
FIG. 10 is a sequence diagram for explaining the operation of the fourth example embodiment of the present invention.

Next, the operation of the present example embodiment will be described in detail with reference to a drawing. FIG. 10 is a sequence diagram for explaining the operation of the fourth example embodiment of the present invention. The following description assumes that the surrogate model has been already generated as in the first to the third example embodiments.

Frist, the assessment apparatus 300d generates AEs (denoted by x' in FIG. 10) using the surrogate model g and transmits them to the assessment target apparatus 100 (step S201). The assessment target apparatus 100 returns to the assessment apparatus 300d an inference result f(x') obtained by inputting the AEs x' to the model f.

After repeatedly generating and transmitting AEs as described above, the assessment apparatus 300d calculates the rate of wrong inference results returned by the assessment target apparatus 100 and outputs the calculated rate as an attack success rate (step S202).

According to the fourth example embodiment described above, it is possible to assess the assessment target model f in terms of resistance to AEs in addition to the similarity of the surrogate model g and the cost of generating it. In general, the fact that AEs attacks are more likely to succeed may mean that the surrogate model g behaves similarly to the assessment target model f. Therefore, this attack success rate can be used as an index instead of the similarity p of the first to the third example embodiments.

Further, the administrator of the assessment target model f would want to update the assessment target model f to be more robust against AEs in order to reduce the attack success rate. Meanwhile, Non-Patent Literature 3 states that a model robust against AEs is more susceptible to MI attacks. This means that it is easier for the MIA execution part 202 of the surrogate model generation apparatus 200 to extract high-quality virtual training data. As a result, the surrogate model g becomes more similar to the assessment target model f, making it possible to generate AEs with a higher attack success rate. According to the present example embodiment, the administrator of the assessment target model f is able to formulate more effective countermeasures against AEs by exploiting this characteristic. If an updated assessment target model f' is robust against AEs, but the attack success rate of the assessment apparatus 300d of the present example embodiment is decreased, the updated model f' can be assessed as having improved resistance to AEs.

FIFTH EXAMPLE EMBODIMENT

Figure 11:
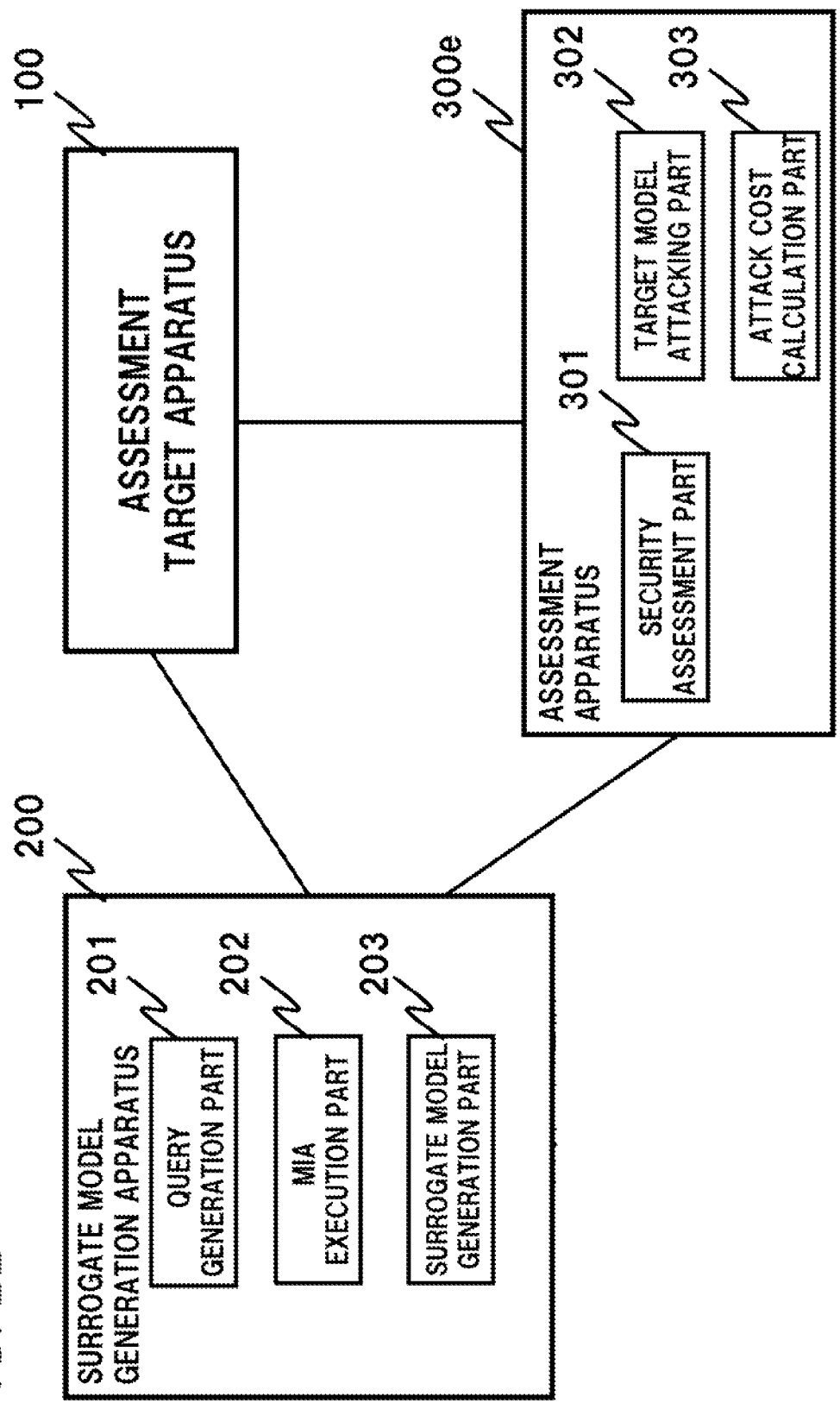
FIG. 11 is a block diagram illustrating the configuration of a fifth example embodiment of the present invention.

A second cost calculation function that calculates the cost required to generate AEs can be added to the configuration of the fourth example embodiment described above. Next, the following describes a fifth example embodiment having the second cost calculation function that calculates the cost required to generate AEs added thereto. FIG. 11 is a block diagram illustrating the configuration of the fifth example embodiment of the present invention. The fifth example embodiment differs from the fourth example embodiment shown in FIG. 9 in that an attack cost calculation part 303 is added to an assessment apparatus 300e. Besides this, the fifth example embodiment is configured in the same manner as the fourth example embodiment, therefore the differences will be mainly described below.

The attack cost calculation part 303 calculates an attack success rate each time AEs are generated and transmitted to the assessment target apparatus 100. Further, when the attack success rate does not reach a predetermined value, the attack cost calculation part 303 instructs the surrogate model generation apparatus 200 to update the surrogate model g. Then, as soon as the attack success rate is equal to or greater than the predetermined value, the attack cost calculation part 303 calculates the cost of an attack using AEs. Like the cost of generating the surrogate model g in the second example embodiment, this attack cost may be calculated by obtaining, for instance, in addition to the number of times queries are transmitted, the number of times the first queries are transmitted by the surrogate model generation apparatus 200 and the number of the virtual training data.

Figure 12:
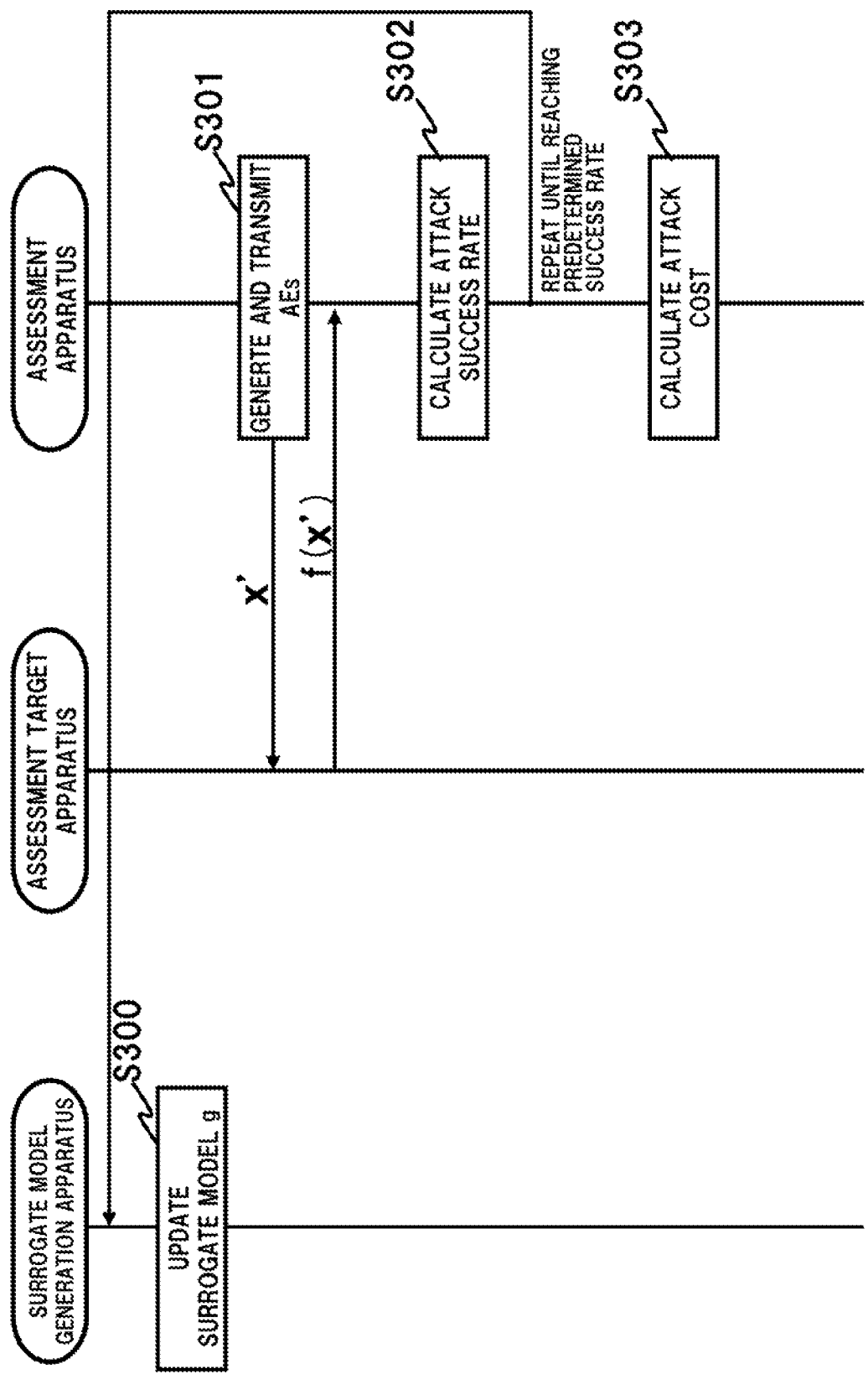
FIG. 12 is a sequence diagram for explaining the operation of the fifth example embodiment of the present invention.

Next, the operation of the present example embodiment will be described in detail with reference to a drawing. FIG. 12 is a sequence diagram for explaining the operation of the fifth example embodiment of the present invention. Step S300 in FIG. 12 corresponds to the process of updating the surrogate model by the surrogate model generation apparatus 200 (the steps S101 to S103 in FIG. 7) in the second example embodiment.

Next, the assessment apparatus 300e generates AEs (denoted by x' in FIG. 12) using the surrogate model g and transmits them to the assessment target apparatus 100 (step S301). The assessment target apparatus 100 returns to the assessment apparatus 300e the inference results f(x') obtained by inputting the AEs x' to the model f.

The assessment apparatus 300e calculates the rate of wrong inference results (attack success rate) returned by the assessment target apparatus 100 on the basis of the inference results f (x') received from the assessment target apparatus 100 (step S302). If the attack success rate is less than a predetermined threshold value, the assessment apparatus 300e requests the surrogate model generation apparatus 200 to execute the process of the step S300 to update the surrogate model.

When the attack success rate is equal to or greater than the predetermined threshold value, the assessment apparatus 300e calculates the cost required for all the attacks using AEs up to that point (step S303).

The lower the value of the cost required to obtain a predetermined successful result using AEs, calculated as described above, the easier it is to launch an attack using AEs. Conversely, the higher the value of the cost, the more difficult it is to attack using AEs. Therefore, the cost required for attacks using AEs, calculated by the assessment apparatus 300e of the present example embodiment, can be used as an index of the security of the assessment target model f.

While each example embodiment of the present invention has been described, it is to be understood that the present invention is not limited to the example embodiments above and that further modifications, replacements, and adjustments may be added without departing from the basic technical concept of the present invention. For instance, the system configuration, the configuration of each element, and the expression of the data shown in each drawing are examples to facilitate understanding of the present invention and are not limited to the configurations shown in the drawings.

For instance, the assessment target model f is held by the assessment target apparatus 100 in the example embodiments described above, however, a different apparatus may store the assessment target model f. For instance, a copy of the assessment target model f for assessment may be held by the surrogate model generation apparatus 200.

Further, although the field of application of the present invention is not limited, from the viewpoint of the ease of query generation, the present invention can be suitably applied to a case where the assessment target model f is a binary classification model. An example of such a binary classification model is the model for malware detection described in Background.

Figure 13:
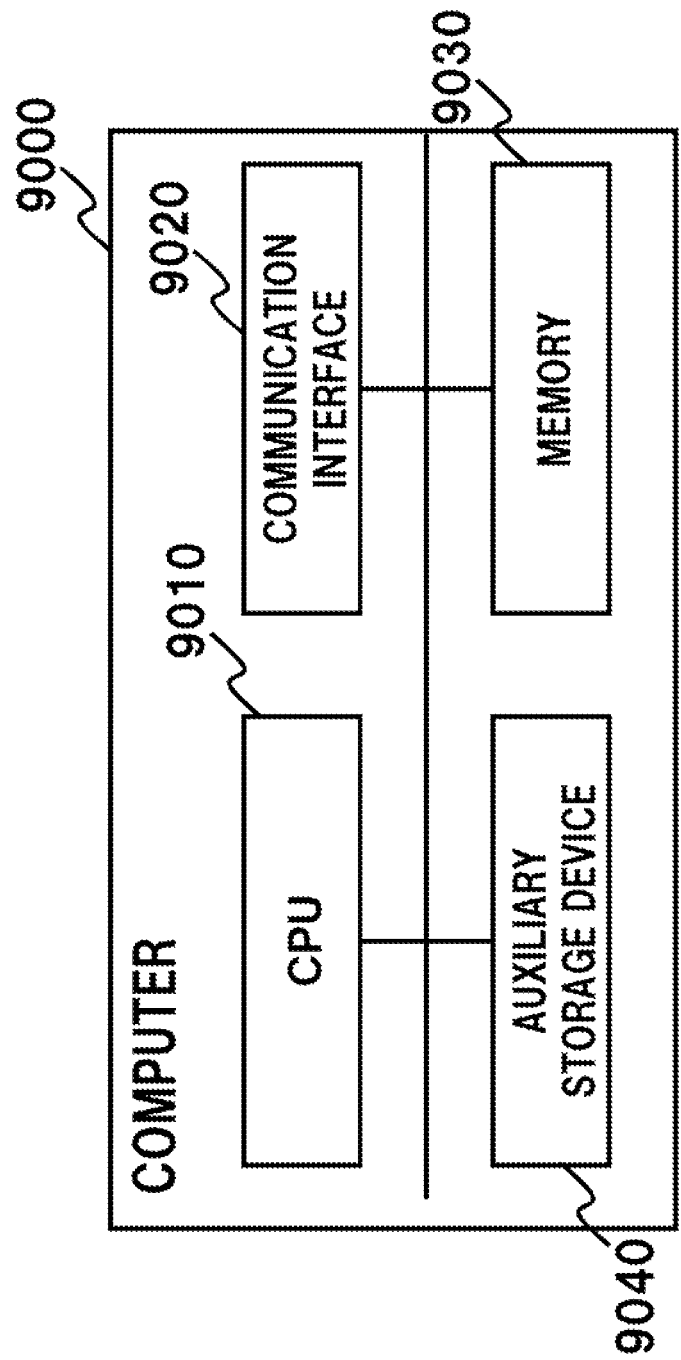
FIG. 13 is a drawing showing the configuration of a computer constituting a surrogate model generation apparatus or an assessment apparatus according to the present invention.

The procedures described in the example embodiments above can be implemented by a program causing a computer (9000 in FIG. 13) that functions as a client to achieve the functions of these apparatuses. Such a computer is illustrated in a configuration comprising a CPU (Central Processing Unit) 9010, a communication interface 9020, a memory 9030, and an auxiliary storage device 9040 shown in FIG. 13. In other words, the CPU 9010 in FIG. 13 may execute a query generation program or a surrogate model generation program to update each computation parameter held in the auxiliary storage device 9040 thereof.

Further, the disclosure of each Patent Literature and Non-Patent Literature cited above is incorporated herein in its entirety by reference thereto and can be used as a basis or a part of the present invention as needed. It is to be noted that it is possible to modify or adjust the example embodiments or examples within the scope of the whole disclosure of the present invention (including the Claims) and based on the basic technical concept thereof. Further, it is possible to variously combine or select (or partially remove) a wide variety of the disclosed elements (including the individual elements of the individual claims, the individual elements of the individual example embodiments or examples, and the individual elements of the individual figures) within the scope of the disclosure of the present invention. That is, it is self-explanatory that the present invention includes any types of variations and modifications to be done by a skilled person according to the whole disclosure including the Claims and the technical concept of the present invention. Particularly, any numerical ranges disclosed herein should be interpreted that any intermediate values or subranges falling within the disclosed ranges are also concretely disclosed even without specific recital thereof. In addition, using some or all of the disclosed elements in each literature cited above as necessary in combination with the elements described herein as part of the disclosure of the present invention in accordance with the object of the present invention shall be considered to be included in the disclosed elements of the present application.

REFERENCE SIGNS LIST

100: assessment target apparatus
200: surrogate model generation apparatus
201: query generation part
202: MIA execution part
203: surrogate model generation part
300, 300a to 300e: assessment apparatus
301, 301c: security assessment part
302: target model attacking part
303: attack cost calculation part
3011: similarity calculation part
3012: cost calculation part
9000: computer
9010: CPU
9020: communication interface
9030: memory
9040: auxiliary storage device

What is claimed is:

1. An assessment apparatus capable of accessing a surrogate model generation apparatus comprising:
  a query generator that generates a first query causing an assessment target model to make an inference to obtain an inference result;
  an MIA execution processor that executes a membership inference attack using as an input the inference result obtained by sending the first query to the assessment target model and infers virtual training data used to train the assessment target model; and
  a surrogate model generator that uses the virtual training data to generate a surrogate model that emulates the behavior of the assessment target model, wherein
  the assessment apparatus comprises:
  a security assessment processor that transmits a second query to both the surrogate model and the assessment target model to assess the security of the assessment target model using the inference results from the surrogate model and the assessment target model in response to the second query, and a target model attacking processor that uses the surrogate model to generate adversarial examples for causing the assessment target model to output a wrong inference result, launches an attack on the assessment target model, and assesses the assessment target model on the basis of whether or not the attack is successful.

2. The assessment apparatus according to claim 1, wherein the query generator generates N queries that are more than M pieces of virtual training data used by the surrogate model generator to generate the surrogate model, and the MIA execution processor selects M pieces of virtual training data having top M scores using the N inference results as inputs.

3. The assessment apparatus according to claim 1, wherein the security assessment processor includes a similarity calculator that calculates the similarity between the results obtained by sending the second query to both the surrogate model and the assessment target model and outputs the similarity as an assessment value.

4. The assessment apparatus according to claim 3, wherein the security assessment processor further includes a cost calculator that calculates cost using at least the number of data d and the number of queries q used by the similarity calculator to obtain a predetermined assessment value and outputs the result as an assessment value.

5. The assessment apparatus according to claim 1, further including an attack cost calculator that calculates cost using at least the number of data d and the number of queries q used by the target model attacking part processor to obtain a predetermined successful result and outputs the result as an assessment value.

6. A security assessment method of a computer for an assessment target model, the computer being capable of accessing a surrogate model generation apparatus that comprises:

a query generator that generates a first query causing an assessment target model to make an inference to obtain an inference result;

an MIA execution processor that executes a membership inference attack using as an input the inference result obtained by sending the first query to the assessment target model and infers virtual training data used to train the assessment target model; and a surrogate model generator that uses the virtual training data to generate a surrogate model that emulates the behavior of the assessment target model, wherein the security assessment method causes the computer to:

transmit a second query to both the surrogate model and the assessment target model; and assess the security of the assessment target model using each inference result from the surrogate model and the assessment target model in response to the input of the second query, generate adversarial examples by using the surrogate model for causing the assessment target model to output a wrong inference result, launch an attack on the assessment target model by using adversarial examples; and assess the assessment target model on the basis of whether or not the attack is successful.

7. A non-transient computer readable medium storing a program causing a computer capable of accessing a surrogate model generation apparatus that comprises:

a query generator that generates a first query causing an assessment target model to make an inference to obtain an inference result;

an MIA execution processor that executes a membership inference attack using as an input the inference result obtained by sending the first query to the assessment target model and infers virtual training data used to train the assessment target model; and a surrogate model generator that uses the virtual training data to generate a surrogate model that emulates the behavior of the assessment target model to execute:

a process of transmitting a second query to both the surrogate model and the assessment target model; and a process of assessing the security of the assessment target model using each inference result from the surrogate model and the assessment target model in response to the second query, wherein the program causes the computer to execute:

a process of generating adversarial examples by using the surrogate model for causing the assessment target model to output a wrong inference result;

a process of launching an attack on the assessment target model by using adversarial examples; and a process of assessing the assessment target model on the basis of whether or not the attack is successful.

8. The security assessment method of the computer for the assessment target model according to claim 6, wherein the query generator generates N queries that are more than M pieces of virtual training data used by the surrogate model generator to generate the surrogate model; and the MIA execution processor selects M pieces of virtual training data having top M scores using the N inference results as inputs.

9. The security assessment method of the computer for the assessment target model according to claim 6, wherein the security assessment method causes the computer to:

calculate the similarity between the results obtained by sending the second query to both the surrogate model and the assessment target model; and output the similarity as an assessment value.

10. The security assessment method of the computer for the assessment target model according to claim 9, wherein the security assessment method causes the computer to:

calculate cost using at least the number of data d and the number of queries q used to obtain a predetermined assessment value; and output the result as an assessment value.

11. The security assessment method of the computer for the assessment target model according to claim 8, wherein the security assessment method causes the computer to:

calculate cost using at least the number of data d and the number of queries q used to obtain a predetermined successful result; and output the result as an assessment value.

12. The non-transient computer readable medium storing a program according to claim 7, wherein the query generator generates N queries that are more than M pieces of virtual training data used by the surrogate model generator to generate the surrogate model; and the MIA execution processor selects M pieces of virtual training data having top M scores using the N inference results as inputs.

13. The non-transient computer readable medium storing a program according to claim 7, wherein
the program causes the computer to execute:
a process of calculating the similarity between the results obtained by sending the second query to both the surrogate model and the assessment target model; and
a process of outputting the similarity as an assessment value.

14. The non-transient computer readable medium storing a program according to claim 7, wherein
the program causes the computer to execute:
a process of calculating cost using at least the number of data d and the number of queries q used to obtain a predetermined assessment value; and
a process of outputting the result as an assessment value.

15. The non-transient computer readable medium storing a program according to claim 7, wherein
the program causes the computer to execute:
a process of calculating cost using at least the number of data d and the number of queries q used to obtain a predetermined successful result; and
a process of outputting the result as an assessment value.

* * * * *